United States Patent
Shapira et al.

(10) Patent No.: US 7,822,148 B2
(45) Date of Patent: Oct. 26, 2010

(54) MIMO-ADAPTED DISTRIBUTED ANTENNA SYSTEM

(75) Inventors: Isaac Shapira, Petach Tikva (IL); Ofer Saban, Moshav Kidron (IL); Yehuda Holtzman, Mazkeret-Batia (IL); Dror Harel, Hod Hasharon (IL)

(73) Assignee: Mobile Access Networks Ltd., Lod (IL)

( * ) Notice: Subject to any disclaimer, the term of this patent is extended or adjusted under 35 U.S.C. 154(b) by 0 days.

(21) Appl. No.: 12/359,321

(22) Filed: Jan. 25, 2009

(65) Prior Publication Data

US 2009/0154621 A1 Jun. 18, 2009

Related U.S. Application Data

(63) Continuation of application No. 12/026,557, filed on Feb. 6, 2008, now Pat. No. 7,483,504.

(60) Provisional application No. 60/889,306, filed on Feb. 12, 2007.

(51) Int. Cl.
 *H04L 27/00* (2006.01)

(52) U.S. Cl. ...................... 375/299; 375/347

(58) Field of Classification Search ............... 375/346, 375/144, 147, 148, 347, 349, 299
See application file for complete search history.

(56) References Cited

U.S. PATENT DOCUMENTS

| | | | | |
|---|---|---|---|---|
| 7,483,504 | B2* | 1/2009 | Shapira et al. | 375/347 |
| 2006/0046662 | A1* | 3/2006 | Moulsley et al. | 455/69 |
| 2006/0063494 | A1* | 3/2006 | Zhang et al. | 455/78 |
| 2007/0104165 | A1* | 5/2007 | Hanaoka et al. | 370/338 |
| 2007/0135169 | A1* | 6/2007 | Sychaleun et al. | 455/562.1 |
| 2007/0173288 | A1* | 7/2007 | Skarby et al. | 455/561 |
| 2007/0182626 | A1* | 8/2007 | Samavati et al. | 342/357.06 |
| 2008/0005219 | A1* | 1/2008 | Nabar et al. | 709/201 |
| 2008/0013473 | A1* | 1/2008 | Proctor et al. | 370/315 |

* cited by examiner

*Primary Examiner*—Emmanuel Bayard
(74) *Attorney, Agent, or Firm*—Mark M. Friedman

(57) ABSTRACT

Methods and systems for carrying different signals required for MIMO communication using a single coaxial cable between two endpoints of a distributed antenna system (DAS) network. Original MIMO signals having the same frequency are frequency-separated at a first endpoint of the network. The frequency-separated signals are propagated together over the single coaxial cable and then reconstructed to their original frequency at a second endpoint of the network.

46 Claims, 9 Drawing Sheets

FIG. 1  KNOWN ART

MIMO-ADAPTED DISTRIBUTED ANTENNA SYSTEM

CROSS REFERENCE TO RELATED APPLICATIONS

This application is a continuation of U.S. patent application Ser. No. 12/026,557, filed Feb. 6, 2008, now US 2008/0192855, and also claims the benefit of U.S. Provisional Application No. 60/889,306 filed Feb. 12, 2007, both of which are incorporated herein by reference.

FIELD AND BACKGROUND OF THE INVENTION

The invention relates generally to wireless communication systems and services and more particularly to Multiple Input Multiple Output (MIMO) technology applied to Distributed Antenna Systems (DAS).

An internal wireless communication system is often deployed to overcome coverage problems inside buildings. The most commonly used internal coverage system is a Distributed Antenna System in which multiple antennas are distributed in the building to provide the required coverage. The antennas are connected, directly or indirectly, to a radio source through coaxial ("coax") cables. The DAS can provide a multiplicity of wireless services in a variety of frequency bands. Since each wireless service is operated in a distinct frequency band, the services do not interfere with each other when they are propagated through the coaxial cables. Using such an architecture, it is possible to provide a multiplicity of services to each antenna of a DAS via a single coaxial cable, while the feeding point is located remotely in a service closet or in a communication room.

An exemplary known DAS is shown in FIG. 1. Three services (Service A, Service B and Service C) are connected to a service combiner 102. The signals of the services are combined in a way that each coaxial cable 104 carries the three services. Since the services are in different frequency bands, they can be distributed on the same cable without disturbing each other. The cables connect the service combiner to antennas located in locations 1 to 4 chosen to provide optimal coverage to the covered area.

The emergence of the MIMO technology has changed the situation. MIMO technology is based on reception and transmission of signals that share the same spectrum, through two or more co-located antennas. That is, MIMO is a technology in which each antenna location includes multiple antennas that process different data streams at the same frequency.

One problem with trying to implement DAS architectures with MIMO technology is the requirement to route each of the MIMO signals in a separate coaxial cable to avoid mutual interference between the signals. This may result in significant increase in the amount of coaxial cables required and may significantly increase the cost and complexity of the installation.

Therefore, there is a need for and it would be advantageous to have systems and methods that supporting implementation of MIMO technology with a "conventional" DAS architecture, i.e. the use of a single coaxial cable.

SUMMARY OF THE INVENTION

The invention discloses methods and systems for carrying different signals required for MIMO communication using a single coaxial cable between two endpoints of a DAS, e.g. between a distribution point and each of the antenna locations. The single coaxial extends at least some of the path between the distribution point and each antenna. In cases it does not extend the entire path, the rest of the path may be covered by another type of cable such as a fiber optic cable.

The invention provides a mechanism for separating (in frequency) MIMO signals which were originally at the same frequency, in a way that the signals do not interfere with each other. This mechanism includes:

a) Frequency shifting stages that support both Forward and Reverse paths of signals selected from the group consisting of Frequency Domain Duplexing (FDD) signals, Time Domain Duplexing (TDD) signals and a combination of FDD and TDD signals.

b) Elements that transfer a clock between a first endpoint and a second endpoint on the same single coaxial cable, to ensure accurate "shift-back" of the frequency-shifted signal.

c) In some embodiments and optionally, an element (receiver) which identifies the active channel of a given service and tunes the frequency shifting stages accordingly.

One original signal remains un-shifted. In this description, the following terminology is used interchangeably for frequency shifting operations: "Frequency shifting", "frequency separation", "frequency down-shift" or "frequency down-conversion" are used to describe the conversion of original frequencies into shifted frequencies. "Frequency reconstruction", "frequency up-shift", "frequency up-conversion" or "frequency shift-back" are used to describe the conversion of shifted frequencies back into original frequencies. After separation, all signals are propagated through the single coaxial cable and reconstructed (to their original frequency) at the second endpoint.

The frequency down-shift and up-shift are performed at one (originating) endpoint by mixing each original signal $f_r$ with a mixing signal $f_m$ to create an intermediate frequency signal $f_i$. At a second endpoint, the opposite function is performed, i.e. the mixing signal $f_m$ is mixed with $f_i$ to shift-back the signal to its original frequency $f_r$. To clarify, each endpoint includes both frequency down-shift and frequency up-shift mechanisms. Since the mixing operation may include multiple unwanted products, it is necessary to pass the signals through a band pass filter (BPF). In order to bring the intermediate signal to the center of the BPF, it is necessary to know the frequency of the original signal $f_r$ and to calculate the mixing signal accordingly, for example by using $f_m = f_r - f_i$. Note that while the mixing may theoretically create four different intermediate frequencies $f_i = +f_r + f_m$, $f_i = +f_r - f_m$, $f_i = -f_r + f_m$ and $f_i = -f_r - f_m$, the last one has no physical meaning.

In applications in which the frequency of the original signal $f_r$ is not known, the mixing signal $f_m$ can not be generated. The only prior information is the frequency band in which the signal may be. In some embodiments, this problem is solved by monitoring the original (un-shifted signal) using a receiver which scans the entire band where the signal may be. Upon reception of a signal, the receiver provides the channel number of the received signal to a frequency synthesizer, which in turn generates the mixing signal based upon the information received from the receiver. In some embodiments the receiver may provide the channel number or frequency of the active channel to a central processing unit ("CPU", not shown). The central processing then commands the synthesizer to create the required frequencies accordingly.

To enable accurate reconstruction of the MIMO signals, a reference frequency signal is transferred from the first endpoint to the second endpoint, using the same cable used for transferring the MIMO signals.

In some embodiments, there is provided a method for propagating MIMO signals in a DAS network including the steps of: (a) providing a plurality n of original MIMO signals; (b) at a first endpoint of the DAS network, frequency shifting n−1 of the MIMO signals into signals with n−1 separate frequencies, with one MIMO signal left un-shifted in frequency; (c) propagating the n−1 frequency shifted signals and the un-shifted frequency signal together over a single coaxial cable extending for at least part of a path from the first endpoint to a second endpoint of the DAS network; and, (cd) at the second endpoint, reconstructing the original MIMO signals.

In some embodiments, there is provided a method for propagating MIMO signals in a DAS network, including the steps of: (a) providing a plurality of MIMO signals; and (b) propagating the plurality of MIMO signals over a single coaxial cable from one endpoint to another endpoint of the DAS network.

In some embodiments, there is provided a system for propagating a plurality of MIMO signals in a DAS network, comprising (a) a master unit and at least one remote unit, each unit having a frequency separation mechanism for separating same-frequency original MIMO signals into frequency-separated MIMO signals and a frequency reconstruction mechanism for reconstructing the same-frequency original MIMO signals from frequency-separated MIMO signals; and (b) a single coaxial cable extending at least partially between the master unit and the at least one remote unit and used to propagate all the frequency-separated MIMO signals between the master unit and the at least one remote unit.

A more complete understanding of the invention, as well as further features and advantages of the invention will be apparent from the following detailed description and the accompanying drawings.

BRIEF DESCRIPTION OF THE DRAWINGS

The invention is herein described, by way of example only, with reference to the accompanying drawings, wherein.

DETAILED DESCRIPTION OF THE INVENTION

The invention is based on the operation of two main units: Master and Remote. A Master unit is the unit to which the signals of the services are interfaced. A Remote unit is the unit to which the antennas are connected. A basic system includes at least one set of MIMO antennas, one Master unit and one Remote unit. The Master units are usually co-located at a central distribution point and interfaced, directly of through other distribution means, to the antenna port of the radio equipment which provides the services. The Remote units are located where coverage is required. The MIMO antennas may be positioned proximate to or attached directly to the Remote unit. When proximate, they are connected thereto by appropriate connectors. In the terminology used herein, the Master unit is associated with one endpoint while the Remote unit is associated with another endpoint of the DAS network.

The Master unit is used to down-convert the signals in the Forward path and up-convert the signals in the Reverse path. The Master unit is connected (directly or indirectly) to the radio equipment which generates the original signals and demodulates the received signals. Each Remote unit is used to down-convert the signals in the Reverse path and up-convert the signals in the Forward path. A single coaxial cable connected to each Remote unit is used to transfer the MIMO signal to and from the Remote unit. The coaxial cable is always connected to each Remote unit. However, in some embodiments, the coaxial cable does not necessarily extend all the way to the Master unit, but may go first to a distribution point which is connected through a coaxial or fiber cable to the Master unit.

Figure 1:
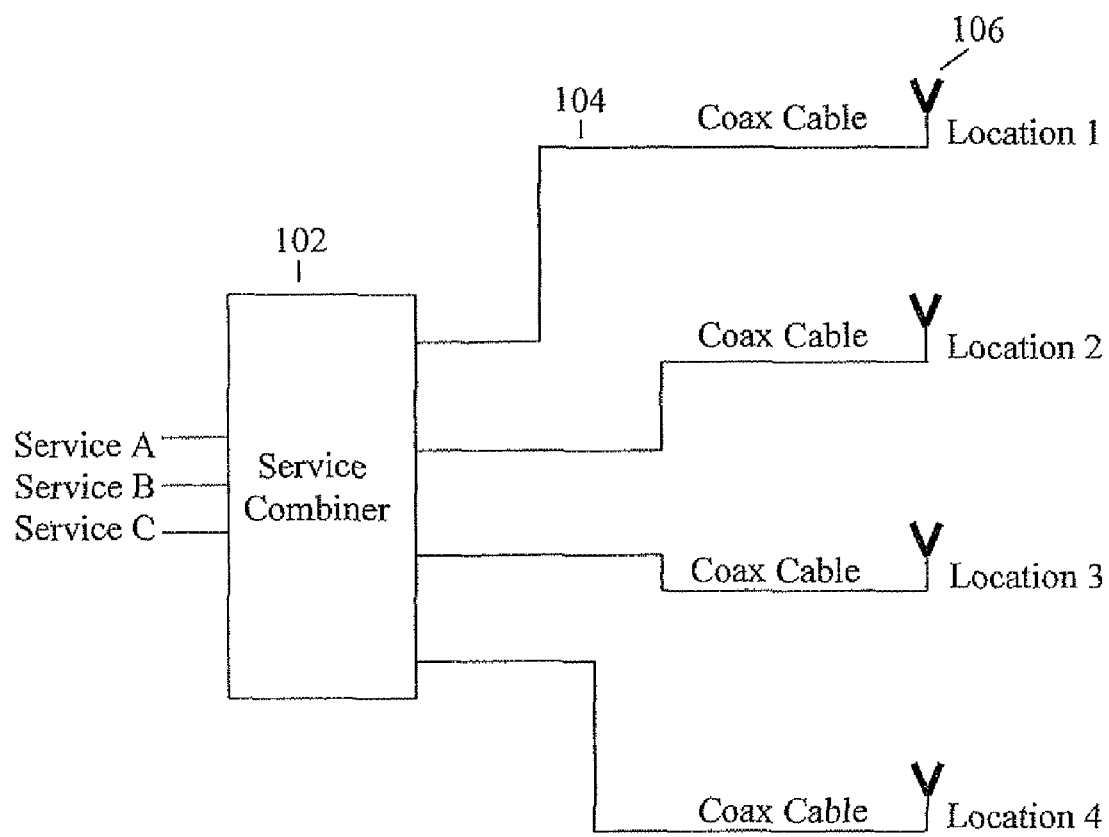
FIG. 1 shows a prior art coaxial distributed antenna system (DAS).
Figure 2:
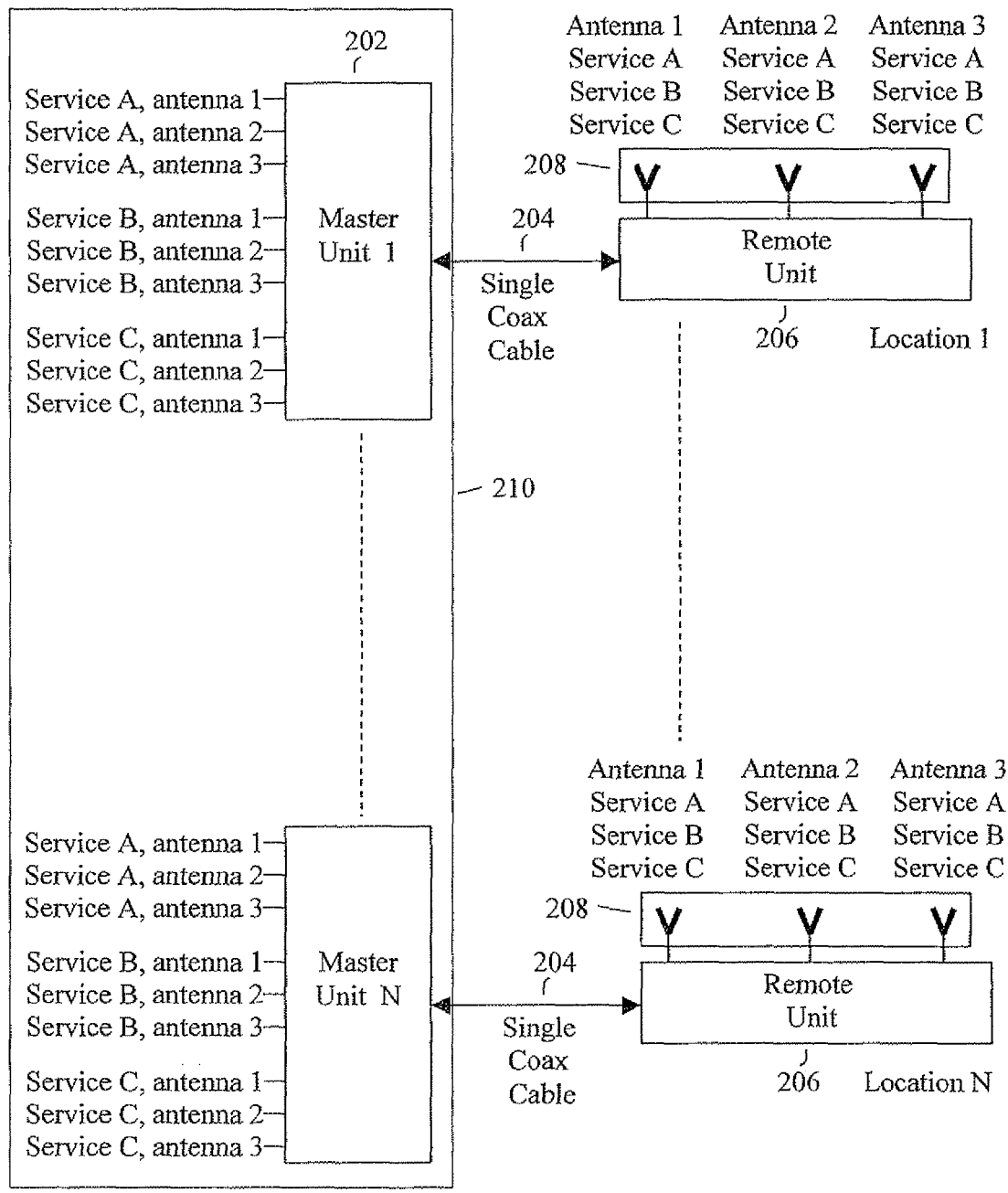
FIG. 2 shows an embodiment of system of the invention.

FIG. 2 shows an exemplary system 200 in which three services (Service A, Service B and Service C), are distributed from a service combiner 210 to antenna arrays 208 in N locations. Each location is served by an array of three antennas connected to a Remote unit 206. The array of the three antennas is used for reception and transmission of signals based on MIMO algorithms. Each antenna provides all three services. All signals of the three antennas, of all services, in both directions (Forward and Reverse) between a Master unit 202 and Remote unit 206, are transferred ("propagated") via a single coaxial cable 204. The number of services and MIMO antennas provided in this figure are given by way of example, and it must be clear other combinations may be supported the same way (e.g. five different services and four signals corresponding to four MIMO antennas). Service combiner 210 includes N Master units 202. Each Master unit may be connected to one or more Remote units. When connected to a plurality of Remote units, the connection may be made through such well known components as power splitters and combiners. The system is bidirectional and supports transmission of forward signals from the Master unit to the antennas and reverse signals from the antennas to the Master unit.

The three signals of each service received by the three antennas at each location occupy the same frequency band. In order to avoid mutual interference between the signals of a service while these are propagated through coaxial cable 204, the signals need to be separated by means of frequency shifting. Frequency separation and frequency shift-back to the original frequencies are performed by both the Master unit and the Remote unit.

Figure 3:
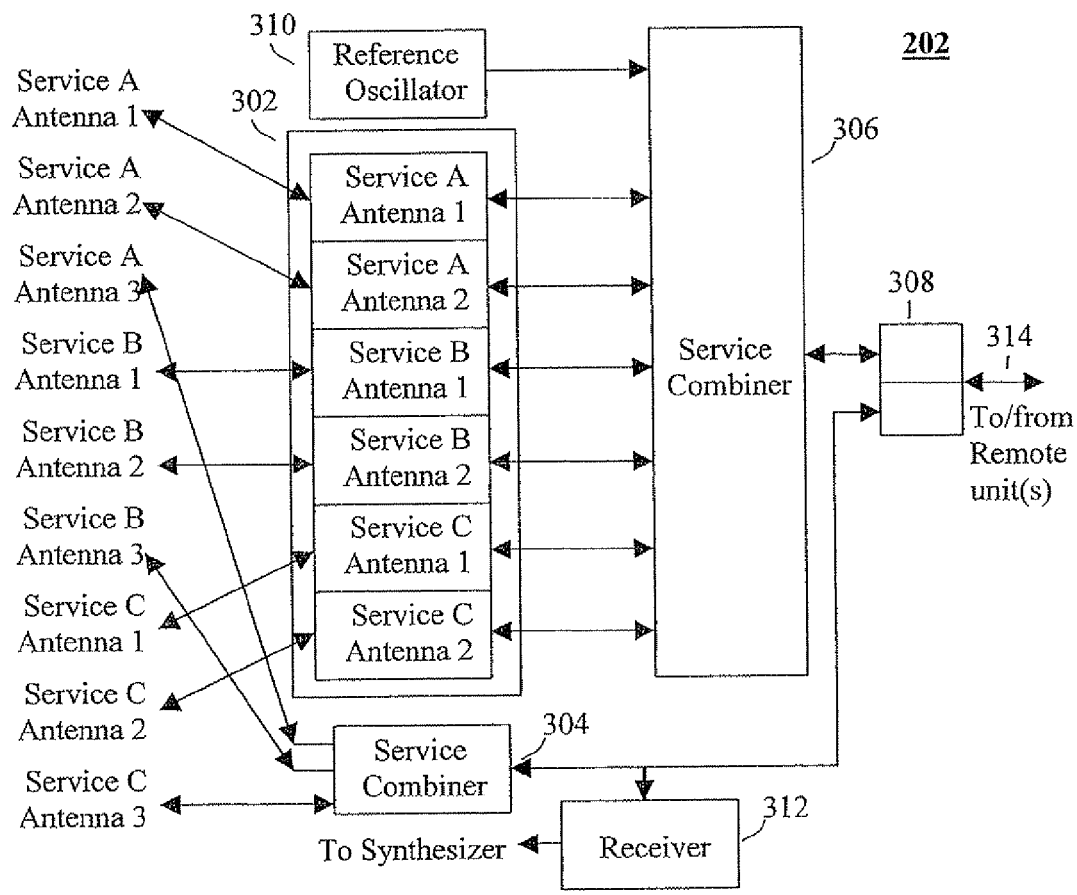
FIG. 3 shows a block diagram of a Master unit.

FIG. 3 shows a block diagram of an exemplary Master unit embodiment with details of its internal structure. The Master unit includes the following elements: a frequency shifting section 302, a first service combiner 304, a second service combiner 306, a duplexer 308, a reference oscillator 310 and a receiver 312, interconnected as shown. According to this embodiment, the Master unit can handle three services (Service A, Service B and Service C), where each service has three different signals corresponding to the three MIMO antennas 1, 2 and 3. The services themselves are in different frequency bands but the three signals of each service are in the same frequency band (see also FIG. 9). Frequency shifting section 302 is used to shift the frequency band of the MIMO signals of each of the services. In some embodiments, all MIMO signals are frequency-shifted. In other embodiments, all but one of the MIMO signals are frequency-shifted (see FIG. 9). This is done by frequency shifting circuits included in section 302. Such circuits are well known in the art. The un-shifted signal frequency is used in the selection of a specific active channel for referencing purposes, see e.g. the description of FIG. 7. To remove any doubt, the invention may be performed both without referencing (all original MIMO signals are frequency-shifted) and with referencing (all but one original MIMO signals are frequency shifted).

In use, in the Forward direction, signals that need to be frequency-shifted are fed to frequency shifting section 302. Section 302 frequency shifts each of the incoming signals to a different frequency band. The shifted signals are fed to second service combiner 306 which handles the "low frequency" signals. The combined signals (now separated in frequency) are fed to duplexer 308. Signals which are not shifted in frequency are combined by first service combiner 304 and fed to duplexer 308. Duplexer 308 is connected through port 314, directly or indirectly, to the Remote unit(s).

In the Reverse direction, signals arriving from the Remote unit are fed to frequency duplexer 308 and split to two frequency bands: "low frequency" signals which include signals that were shifted from their original frequency by the Remote unit, and "high frequency" signals which include un-shifted frequencies. The "low frequency" signals are fed to second service combiner 306 which acts in this direction as a signal splitter and splits the combined signals to the different frequency conversion paths of frequency conversion section 302. The frequency conversion paths of frequency conversion section 302 shifts back the signals to their original frequency.

Reference oscillator 310 is used to synchronize the synthesizer which generates the mixing signals in the frequency shifting section. The signal of the reference oscillator is fed to second service combiner 306 where it is combined with the other signals and sent to the Remote unit. Receiver 312 in the Master unit is used for monitoring the "un-shifted" signals. The purpose of this monitoring is to enable automatic selection of a specific active channel. The following example will demonstrate the need and the implementation. The bandwidth dedicated for each service is limited (practically may range between 10 to 25 MHz). On the other hand, the operation band of some services is significantly higher then this bandwidth. For example, the operation band of the 802.11a service is 700 MHz ranges between 5.15 to 5.85 GHz. It is obvious that the whole operation band of 700 MHz can not be processed simultaneously. The 802.11a service uses only one channel at a time limited to 20 MHz bandwidth To enable the multiplexing of the services in frequency, there is a need to identify which specific channel is in use and tune the system accordingly.

Figure 4:
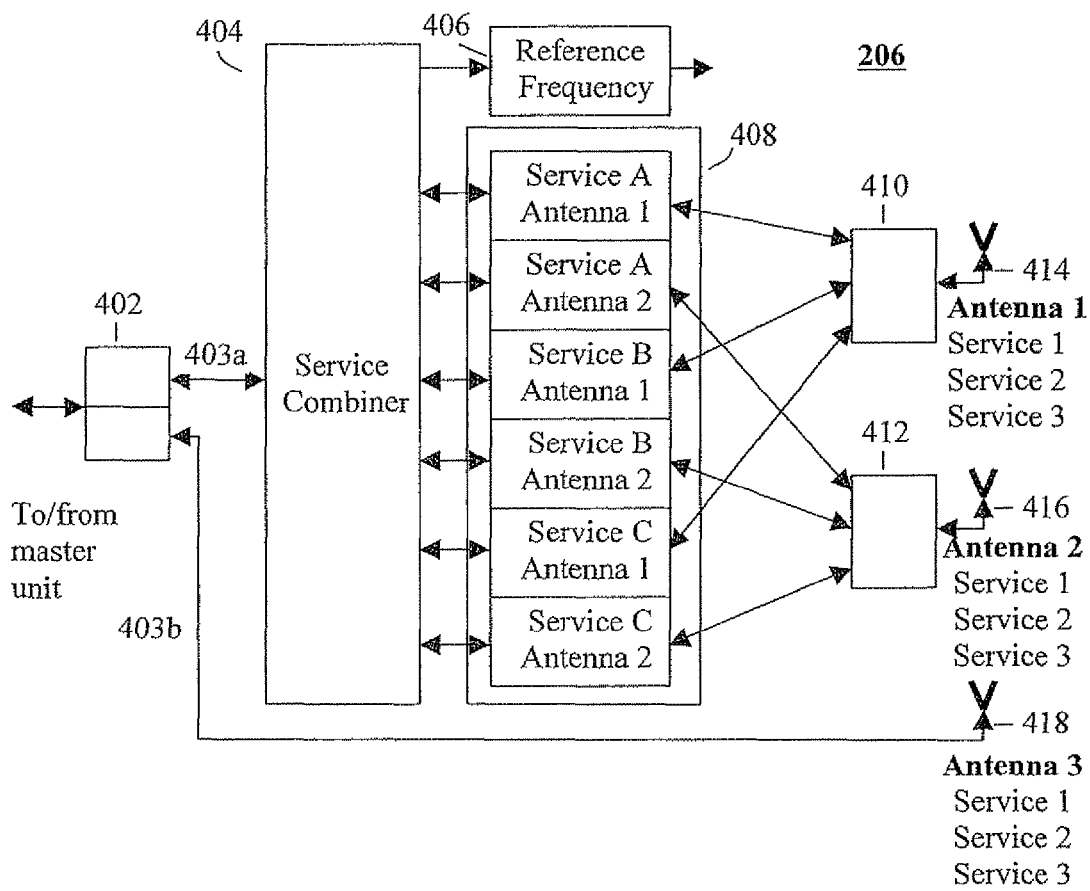
FIG. 4 shows a block diagram of a Remote unit.

FIG. 4 shows a block diagram of an exemplary Remote unit embodiment with details of its internal structure. The Remote unit includes the following elements: a frequency duplexer 402, a service combiner 404, a frequency shifting section 408, two service combiners 410 and 412, a receiver 420 and a reference frequency reconstruction unit 406. According to this example the Remote unit can handle three services (Service A, Service B and Service C), where each service has three different signals corresponding to the three MIMO antennas 414, 416 and 418. The services themselves are in different frequency bands but the three signals of each service are in the frequency band of the signals of each of the services, except for one signal for each service which remains un-shifted (see FIG. 9).

In use, in the Forward direction, the combined signal arrives at the Remote unit through frequency duplexer 402, which separates the incoming signal into two frequency bands: a "low frequency" band 403a which includes the shifted signals and the reference frequency signal and a "high frequency" band 403b which includes the un-shifted signals. The un-shifted signals are transferred directly to Antenna 3 418. The signals of the "low frequency" band are fed to service combiner 404 which acts in this direction as a power splitter that splits the combined signals to separate paths fed to the frequency conversion section 408. Frequency shifting section 408 shifts back the signals to their original frequency. The signals, now in their original frequencies, are routed from frequency shifting section 408 to service combiners 410 and 412 and fed to Antennas 1 (414) and 2 (416) respectively.

In the Reverse direction, signals received in Antenna 3 are fed directly to frequency duplexer 402. Signals received in Antennas 1 and 2 are fed to service combiners 410 and 412 respectively. From service combiners 410 and 412, the signals are fed to frequency shifting section 408 where they are shifted in frequency to avoid collision between signals of the same frequency band. The shifted signals are then combined by service combiner 404 and fed to "low frequency" port 403a of duplexer 402, in which they are combined with the "high frequency" signals received at port 403b. The combined signals are then fed through the single coaxial cable, directly or indirectly, to the Master unit. By "directly" it is meant that the signals are propagated the entire path from the Remote to the Master unit via the coaxial cable. By "indirectly" it is meant that the signals are propagated only part of the path from the Remote to the Master unit via the coaxial cable, with the other part of the path being another type of cable, for example a fiber optic cable. For example, the signals may be sent from the Remote unit, via the coaxial cable, to a "RF to optics" converter (not shown). In the "RF to optics" converter, the signals are converted from RF signals to modulated light and further propagated through a fiber optic cable for the rest of the path to the Master unit. Reference frequency unit 406 is an oscillator which is synchronized with the reference signal generated by reference oscillator 310 of the Master Unit. The reference signal is transferred to reference frequency unit 406 through service combiner 404 and duplexer 402.

Figure 5:
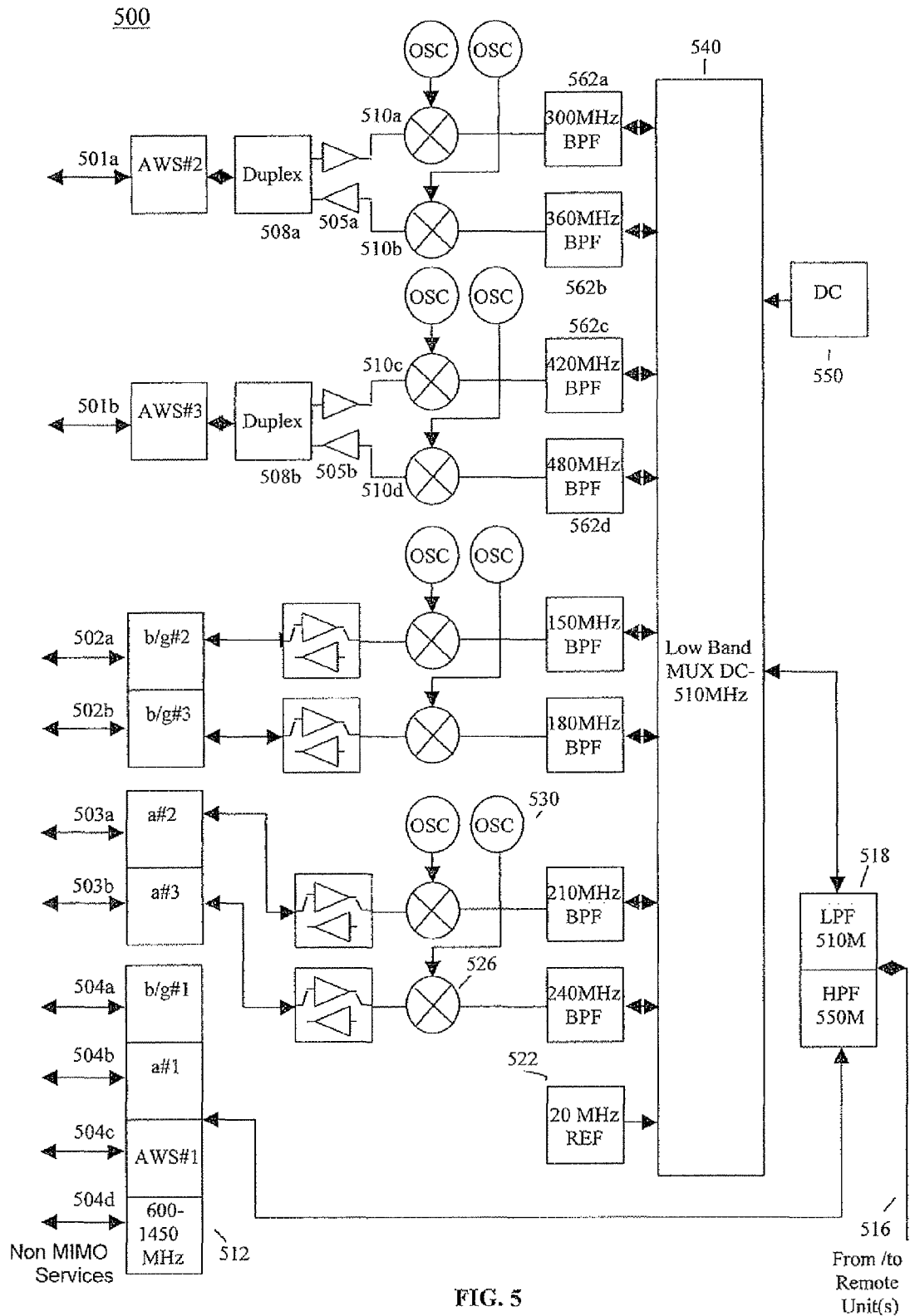
FIG. 5 shows an exemplary implementation of a Master unit.

FIG. 5 shows the details of an exemplary implementation of a Master unit 500. Master unit 500 is shown processing four different services in four different frequency bands. All services and frequencies mentioned herein are exemplary, and their use in examples should by no means considered as limiting the spirit and scope of the invention. In FIG. 5, three types of services are shown operating in MIMO mode: AWS (Wireless services at 1710-1755 MHz band uplink and 2110-2155 MHz downlink), WiFi-802.11b/g services operating in the 2.4-2.5 GHz band and WiFi-802.11a services operating in the 5.15 to 5.85 GHz band (and marked in the figures as a#). Each of these three services includes three signals (corresponding to the three MIMO antennas). An additional band, called in this example "Non-MIMO services", handles services which do not use the MIMO algorithm and therefore use only one of the MIMO antennas. It should be noted that the structure of Master unit 500 is given as an example. Based on the same principle, different types of Master units can be created to handle other types and combinations of services. The target frequencies of the Reverse and Forward conversions in the Master and Remote units are also given as an example and other sets of frequencies can be used.

In operation, ports 504a, 504b and 504c are used for signal #1 of the three multiple signal (MIMO) services. Port 504d is used for "Non-MIMO services" shown in this example as ranging between 600 to 1450 MHz. In the Forward direction, the signals arriving at ports 504a, 504b, 504c (signals #1) and 504d (low band services signal) are combined by a service combiner 512 and directed to a frequency duplexer 518. The output of the frequency duplexer is provided directly or indirectly to the coaxial cable connected to a Remote unit, where the antenna elements are located (not shown). Ports 501(a and b), are used for signals AWS #2 and AWS #3 of the MIMO services. Ports 502 (a and b) and 503 (a and b) are used for the b/g#2 and a#3 signals. The b/g#2, b/g#3, a#2 and a#3 signals belong to WiFi services which are multiplexed in time (TDD) and therefore the same path is used for both Reverse and Forward links. Signals AWS #2 and AWS #3 of the AWS service are bidirectional FDD signals and therefore separated by duplexers 508a and 508b into Forward and Reverse paths. The AWS#2 and AWS#3 signals enter bidirectional amplification stages 505a and 505b respectively. After amplification in these stages, the Forward link signals AWS#2 and AWS#3 are down-converted by respective down-conversion stages 510a and 510c and filtered by respective band pass filters (BPF) 562a and 562c. Specific band pass filters are shown by way of example only, with the understanding that other types of filters in other frequency ranges may also be used and are within the scope of the invention. For example 562a (marked as 300 MHz BPF) is a BPF with a center frequency of 300 MHz. The bandwidth of these filters in this specific and exemplary implementation is 20 MHz. The filtered signals are combined by MUX 540, which acts in the Forward path as a signal combiner and acts in the Reverse path as a signal splitter. The MUX in this specific implementation can handle signals ranging from DC to 510 MHz. Other types of power combiners and splitters capable of handling signals in other frequency ranges can be used and are within the scope of the invention. The output of MUX 540 is fed to the low band port of the frequency duplexer 518, which combines the down-converted signals #2 and #3 of the MIMO services with signal #1 of the MIMO services and with the "Non-MIMO services" signals. Signals b/g#2, b/g#3, a#2 and a#3, fed to ports 502a, 502b, 503a, 503b are also down-converted using similar architecture. The only difference is that each of these signals is TDD (Forward and Reverse paths use the same frequencies in different time slots) and therefore do not need to be separated to different Reverse and Forward paths with different frequency bands.

In the Reverse path, a bundle of frequency channels is fed to the Master unit via port 516 of frequency duplexer 518. Frequency duplexer 518 separates these channels to "low frequencies" (below 510 MHz) and to "high frequencies (above 550 MHz). The signals above 550 MHz are either signals #1 of the MIMO services or "Non-MIMO services" signals. These signals are directed to frequency multiplexer 512 and then separated by frequency band to their related ports. Signals below 510 MHz are routed to the "low band MUX" 540, which acts in this direction as a signal splitter and splits the combined signals to the different frequency conversion paths. The Reverse link AWS#2 and AWS#3 MIMO signals are brought to the Master unit at frequency bands centered around 360 MHz and 480 MHz respectively. After passing frequency duplexer 518 and MUX 540, these signals are filtered by band pass filters 562b and 562d respectively, followed by up-conversion in up-conversion stages 510b and 510d, respectively. These two signals are then amplified by amplifiers 505a and 505d, respectively, fed to duplexers 508a and 508b respectively and fed to ports 505a and 501b respectively.

The b/g#2, b/g#3, a#2 and a#3 WiFi signals are also up-converted using similar architecture. The only difference is that each of these signals is TDD (Forward and Reverse paths use the same frequencies in different time slots) and therefore do not need to be separated to different Reverse and Forward paths with different frequency bands.

Reference oscillator 522 is used as a reference to a synthesizer 720 (see FIG. 7) that generates the frequencies of the frequency shifting stages. The 20 MHz reference signal shown in FIG. 5 is exemplary. The synthesizer generates multiple frequencies shown in FIG. 5 as "OSC". OSC 530 which feeds mixer 526 is an example of these mixing frequencies. The signal of the reference oscillator is also fed to low band MUX 540, which acts as a service combiner. The reference oscillator signal is combined there with all other 'low frequency" signals, fed to duplexer 518 and transferred to the Remote unit.

Figure 6:
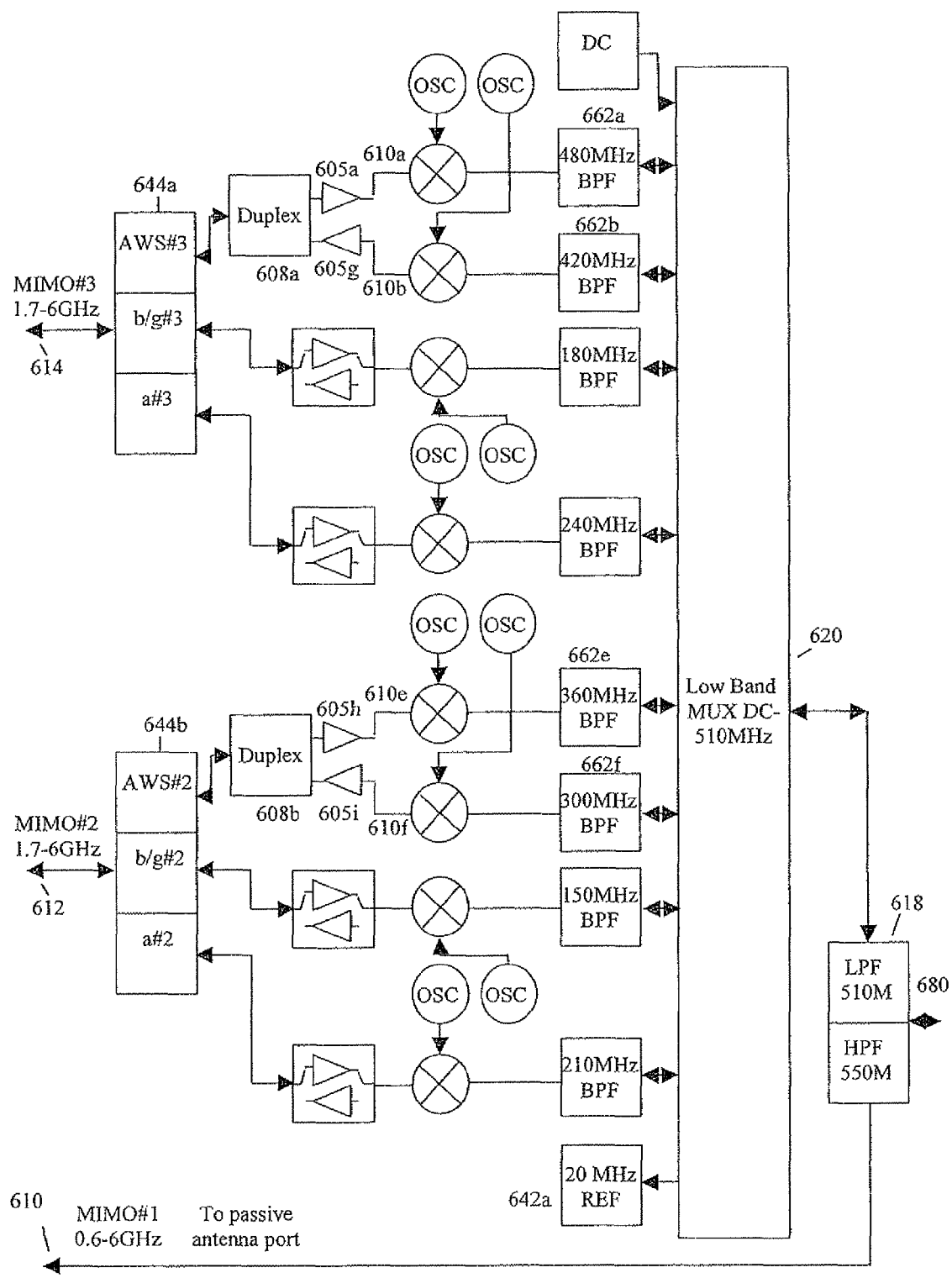
FIG. 6 shows an exemplary implementation of a Remote unit.

FIG. 6 shows the details of an exemplary implementation of a Remote unit. The Remote unit is connected to the rest of the system via the coaxial cable and feeds an array of three antennas through ports 610, 612 and 614. Port 610 is used for signals #1 of the AWS, 802.11b/g and 802.11a services and for "Non-MIMO services". Port 612 is used for signals #2 of the AWS, 802.11b/g and 802.11a services. Port 614 is used for signals #3 of the AWS, 802.11b/g and 802.11a services.

The b/g#2, b/g#3, a#2 and a#3 signals belong to WiFi services that are multiplexed in time (TDD) and therefore the same path is used for both Reverse and Forward links. Signals AWS#2 and AWS#3 of the AWS service are bidirectional FDD signals and therefore have separate Forward and Reverse paths.

In the Forward path, the signals enter the Remote unit through a port 680 and are separated by a duplexer 618 to frequencies below 510 MHz and frequencies above 550 MHz. The frequencies above 550 MHz include signal #1 of the AWS, 802.11b/g and 802.11a services as well as of the "Non-MIMO services". Signal #1 of the AWS, 802.11b/g and 802.11a services as well as of the "Non-MIMO services" go directly to antenna port 610. Forward AWS#2 and AWS#3 MIMO signals are brought to the Remote unit at frequency bands centered around 300 MHz and 420 MHz respectively. After passing through MUX 620 and filtered by band pass filters 662f and 662b respectively, the AWS#2 and AWS#3 Forward signals are up-converted by up-conversion stages 610f and 610b, respectively. Then these two signals are respectively amplified by amplifiers 605i and 605g respectively, fed to duplexers 608b and 608a respectively and fed to triplexers 644b and 644a respectively, which are used as service combiners. The b/g#2, b/g#3, a#2 and a#3 WiFi signals are also up-converted using similar architecture. The only difference is that each of these signals is TDD (Forward and Reverse paths use the same frequencies in different time slots) and therefore do not need to be separated to different Reverse and Forward paths with different frequency bands.

In the Reverse path, the signals received at MIMO antenna#1 are fed through a port 610 and fed directly to frequency duplexer 618. The signals received in MIMO antenna#2 and MIMO antenna#3 through ports 612 and 614 respectively are fed to triplexers 644b and 644a, respectively. Each triplexer separates the incoming signals to three frequency bands: 1.710-2.155 GHz for the AWS service, 2.4-2.5 GHz for the 802.11b/g service and 5.15 to 5.85 GHz band for the 802.11a service. The AWS #2 and AWS #3 signals enter duplexers 608b and 608a respectively and routed to amplifiers 605h and 605a respectively. After the amplification, the Reverse path signals AWS#2 and AWS#3 are down-converted by mixers 610e and 610a and filtered by band pass filters 662e and 662a respectively. The filtered signals are combined by low band MUX 620 which acts as a service combiner and fed to the low band port of frequency duplexer 618, which combines the down-converted signals #2 and #3 of the MIMO services with signal #1 of the MIMO services and with the "low band services" signal. Signals b/g#2, b/g#3, a#2 and a#3, are also down-converted using similar architecture. The only difference is that each of these signals is TDD (Forward and Reverse paths use the same frequencies in different time slots) and therefore do not need to be separated to different Reverse and Forward paths with different frequency bands.

20 MHz REF 642a is an oscillator which is synchronized with the reference signal generated by reference oscillator 20 MHz REF 522 of the Master Unit (FIG. 5). The reference signal originates in the Master signal and transfers to the 20 MHz REF 642a through duplexer 618 and low band MUX 620.

Figure 7:
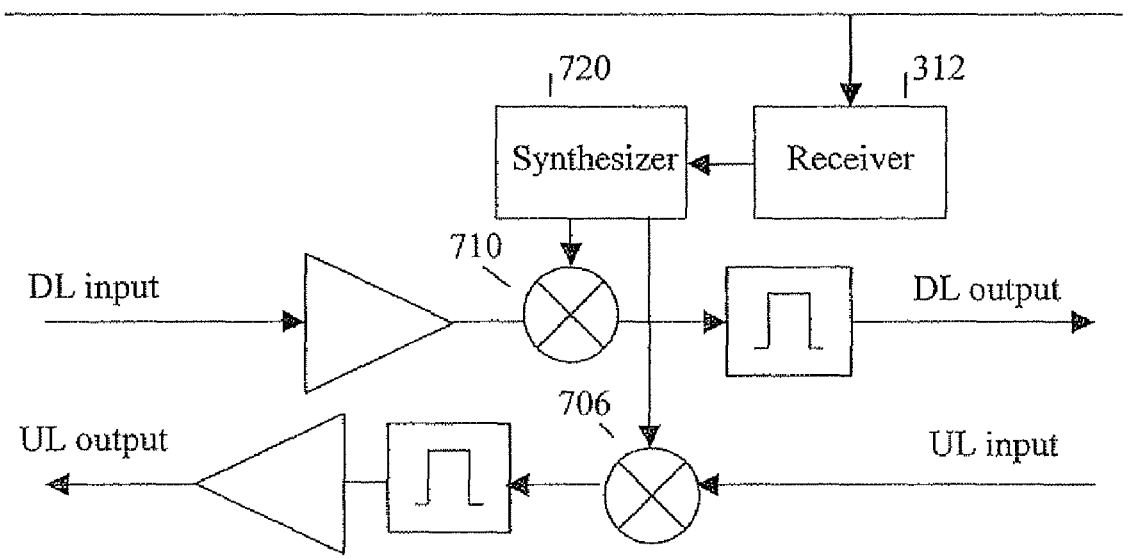
FIG. 7 shows the elements of an exemplary active channel identification and system tuning.

Specific channel identification may be exemplarily based on the use of a simple receiver which monitors the transmitted data. FIG. 7 shows the elements of an exemplary active channel identification and system tuning. Receiver 312 monitors the transmitted signals on the "legacy line" 718 which carries the un-shifted signals. This transmission contains the information on which specific channel the service is operating. When identifying which channel is in use, the receiver 312 provides this information to the synthesizer 720. According to the information received from the receiver, the synthesizer generates the required frequencies for mixer 710 of the forward path (DL) conversion and for mixer 706 the reverse path (UL) conversion. In some embodiments, the receiver may provide the channel number or frequency of the active channel to a CPU (not shown). The CPU then commands the synthesizer to create the required frequencies accordingly.

Figure 8:
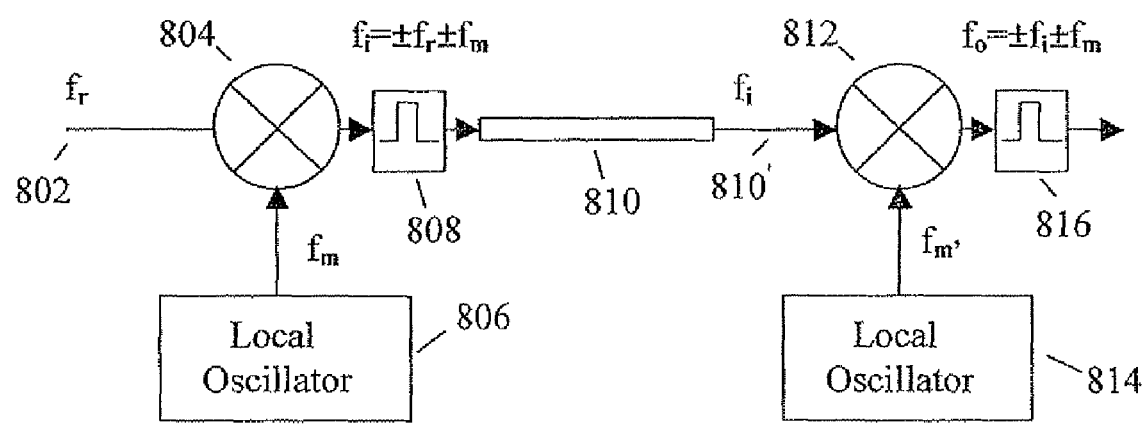
FIG. 8 shows schematically the frequency shifting and shift-back procedures.

The frequency shifting and shift-back are shown schematically in FIG. 8. They are performed by mixing the incoming signal with a signal obtained by a local oscillator. The incoming signal at frequency $f_r$ is mixed by mixer 804 with a local oscillator 806 signal having a frequency $f_m$. The product of the mixer may be at a frequency described by $f_i = \pm f_r \pm f_m$. A filter 808 at the output of the mixer 806 determines which of the possible combinations of $f_i$ will be selected.

Figure 9:
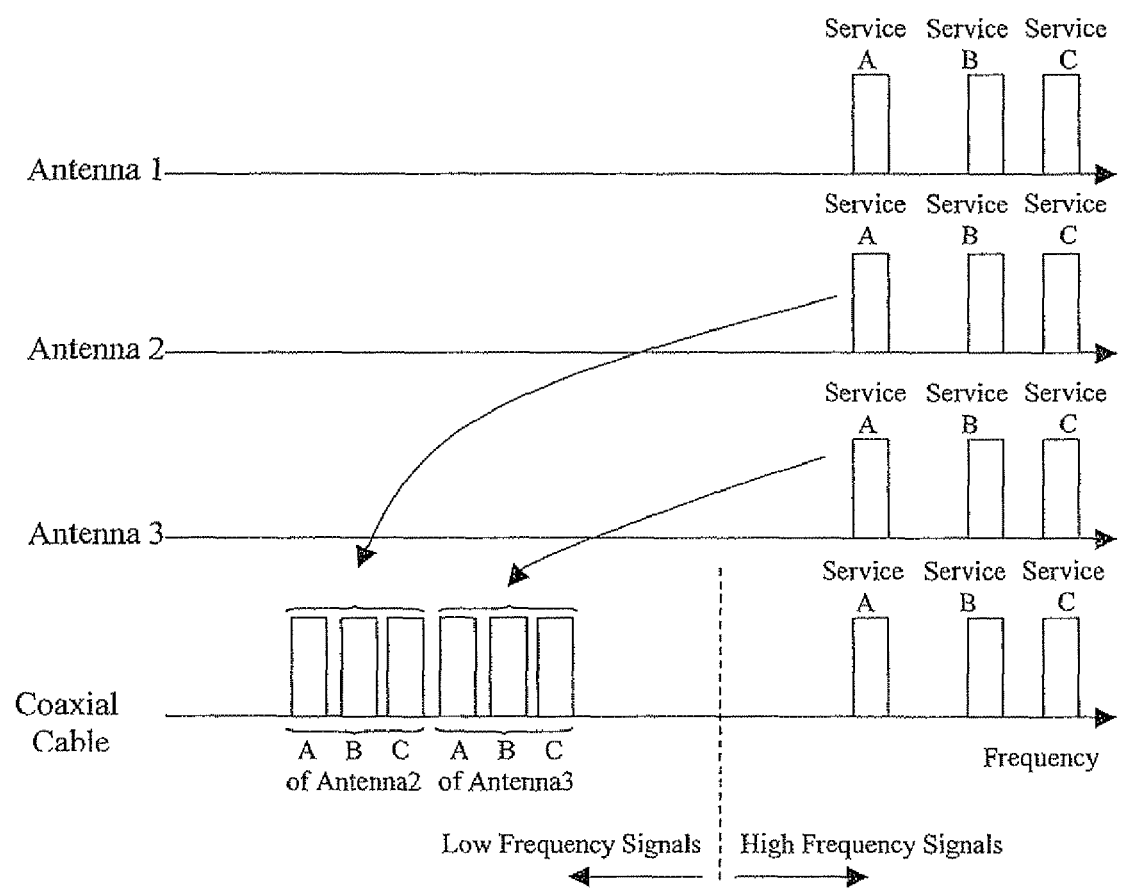
FIG. 9 shows a spectrum of the MIMO signals of three services received in three MIMO antennas and the spectrum of these signals after frequency shifting of signals of antennas 2 and 3.

As an example to be used in the following explanation, the required combination may be $f_i = f_m - f_r$. The signal with this frequency is fed to cable 810 and arrives through it (or through a propagation section 810' that continues cable 810, as explained above) to the Remote unit which includes, among other elements, a mixer 812, a local oscillator 814 and a band pass filter 816. The incoming signal at frequency $f_i$ is mixed at mixer 812 with the signal produced by the local oscillator 814 with frequency $f_r$. Filter 816 selects, according to this example, the frequency combination $f_o = f_m - f_i$. In order for $f_o$ to be exactly the same frequency as $f_r$, $f_{m'}$ needs to be exactly the same frequency as $f_m$. In other words, the frequency of both local oscillators needs to be the identical. FIG. 9 shows the spectrum of the MIMO signals of three services received in each of the three MIMO antennas (1, 2 and 3) and the spectrum of these signals after frequency shifting, as they are propagated along the single coaxial cable.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

What is claimed is:

1. A system for carrying signals of two different services between two endpoints of a distributed antenna system (DAS) network comprising:

a) a master unit associated with one endpoint of the DAS network and used to serve simultaneously the two different services, wherein at least one service uses MIMO signals;
   b) a remote unit associated with another endpoint of the DAS network; and
   c) a single coaxial cable used to transfer bi-directionally reverse path and forward path signals of the two services between the master and remote units;

wherein the remote unit is operatively coupled to two antennas, transmits respective MIMO forward path signals via the two antennas and receives respective MIMO reverse path signals via the two antennas.

2. The system of claim 1, wherein the master unit includes a master unit frequency shifter which is used for frequency shifting a MIMO reverse path signal and a MIMO forward path signal using time domain division (TDD), the frequency shifting resulting in a forward path frequency shifted signal and a reverse path signal shifted back to an original frequency.

3. The system of claim 2, wherein the remote unit includes a remote unit frequency shifter which is used for frequency shifting a MIMO forward path signal and a MIMO reverse path signal using time domain division (TDD), the frequency shifting resulting in a reverse path frequency shifted signal and a forward path signal shifted back to an original frequency.

4. The system of claim 1, wherein one of the at least one service that uses MIMO signals is a MIMO frequency domain division (FDD) service wherein the master unit includes two master unit frequency shifters, one master unit frequency shifter used for frequency shifting a MIMO reverse path signal and another master unit frequency shifter used for frequency shifting a MIMO forward path signal of the FDD service, the frequency shifting resulting in a forward path frequency shifted signal and a reverse path signal shifted back to an original frequency.

5. The system of claim 4, wherein the remote unit includes two remote unit frequency shifters, one remote unit frequency shifter used for frequency shifting a MIMO reverse path signal and another remote unit frequency shifter used for frequency shifting a MIMO forward path signal of the FDD service, the frequency shifting resulting in a reverse path frequency shifted signal and a forward path signal shifted back to an original frequency.

6. The system of claim 5, wherein the master unit includes an additional master unit frequency shifter which is used for frequency shifting the reverse path signal and the forward path signal using time domain division (TDD).

7. The system of claim 6, wherein the remote unit includes an additional remote unit frequency shifter which is used for frequency shifting the forward path signal and reverse path signal using time domain division (TDD).

8. The system of claim 2, wherein the master unit includes a plurality of band pass filters for selecting an reverse path signal received through the coaxial cable before it is passed to the master unit frequency shifter.

9. The system of claim 4, wherein the master unit includes a plurality of band pass filters for selecting an reverse path signal received through the coaxial cable before it is passed to the master unit frequency shifter.

10. The system of claim 3, wherein the remote unit includes a plurality of band pass filters for selecting a forward path signal received through the coaxial cable before it is passed to the remote unit frequency shifter.

11. The system of claim 5, wherein the remote unit includes a plurality of band pass filters for selecting a forward path signal received through the coaxial cable before it is passed to the remote unit frequency shifter.

12. The system of claim 2, wherein another MIMO reverse path signal and another MIMO forward path signal that use TDD bypass the master unit frequency shifter, so that the other MIMO reverse path signal is transmitted to the service that uses MIMO signals without being shifted in frequency and so that the other MIMO forward path signal is transmitted to the remote unit without being shifted in frequency.

13. The system of claim 3, wherein another MIMO forward path signal and another MIMO reverse path signal that use TDD bypass the remote unit frequency shifter, so that the other MIMO forward path signal is transmitted via its respective one of the two antennas without being shifted in frequency and so that the other MIMO reverse path signal is transmitted to the master unit without being shifted in frequency.

14. The system of claim 4, wherein another MIMO reverse path signal and another MIMO forward path signal of the FDD service bypass the master unit frequency shifter, so that the other MIMO reverse path signal is transmitted to the one service without being shifted in frequency and so that the other MIMO forward path signal is transmitted to the remote unit without being shifted in frequency.

15. The system of claim 5, wherein another MIMO forward path signal and another MIMO reverse path signal of the FDD service bypass the remote unit frequency shifter, so that the other MIMO forward path signal is transmitted via its respective one of the two antennas without being shifted in frequency and so that the other MIMO reverse path signal is transmitted to the master unit without being shifted in frequency.

16. The system of claim 1, wherein the master unit includes two master unit frequency shifters which are used for frequency shifting respective MIMO reverse path signals and respective MIMO forward path signals using time domain division (TDD), the frequency shifting resulting in two different forward path frequency shifted signals at two different respective forward path frequencies and two reverse path signals shifted back to respective original frequencies.

17. The system of claim 16, wherein the remote unit includes two remote frequency shifters which are used for frequency shifting respective MIMO forward path signals and respective MIMO reverse path signals using TDD, the frequency shifting resulting in two different reverse path frequency shifted signals at two different respective reverse path frequencies and two forward path signals shifted back to respective original frequencies.

18. The system of claim 1, wherein each of the at least one service that uses MIMO signals is a MIMO frequency domain division (FDD) service, wherein the master unit includes two master unit frequency shifters used for frequency shifting respective MIMO reverse path signals of each FDD service and two other master unit frequency shifters used for frequency shifting respective MIMO forward path signals of each FDD service, the frequency shifting resulting in two forward path frequency shifted signals at two different respective forward path frequencies and two reverse path signals shifted back to respective original frequencies.

19. The system of claim 18, wherein the remote unit includes two remote unit frequency shifters used for frequency shifting respective MIMO reverse path signals and two other remote unit frequency shifters used for frequency shifting respective MIMO forward path signals of each FDD service, the frequency shifting resulting in two reverse path frequency shifted signals at two different respective reverse path frequencies and two forward path signals shifted back to respective original frequencies.

20. The system of claim 1, further comprising:
d) a transmission medium, other than a coaxial cable, that is operatively coupled in series with the single coaxial cable and that cooperates with the single coaxial cable to transfer bi-directionally the reverse path and forward path signals of the two services between the master and remote units.

21. The system of claim 20, wherein the transmission medium is a fiber optic cable.

22. A method for carrying signals of two different services between two endpoints of a distributed antenna system (DAS) network comprising the steps of:
a) providing a master unit associated with one endpoint of the DAS network and used to serve simultaneously the two different services, wherein at least one service uses MIMO signals;
b) providing a remote unit associated with another endpoint of the DAS network and operatively coupled to two antennas;
c) transferring bi-directionally reverse path and forward path signals of the two services between the master and remote units through a single coaxial cable;
d) transmitting respective MIMO forward path signals via the two antennas; and
e) receiving respective MIMO reverse path signals via the two antennas.

23. The method of claim 22, wherein one of the at least one service that uses MIMO signals is a MIMO time domain division (TDD) service, wherein the step of transferring includes, at the master unit, frequency shifting a MIMO reverse path signal of the one service and a MIMO forward path signal of the one service using time domain division, the frequency shifting resulting in a forward path frequency shifted signal and a reverse path signal shifted back to an original frequency, the two signals being transferred bi-directionally through the single coaxial cable.

24. The method of claim 23, wherein the step of transferring further includes, at the remote unit, frequency shifting a MIMO forward path signal of the one service and a MIMO reverse path signal of the one service using time domain division, the frequency shifting resulting in a reverse path frequency shifted signal and a forward path signal shifted back to an original frequency, the two signals being transferred bi-directionally through the single co-axial cable.

25. The method of claim 22, wherein one of the at least one service that uses MIMO signals is a MIMO frequency domain division (FDD) service, wherein the master unit includes two master unit frequency shifters, and wherein the step of transferring includes, at the master unit, frequency shifting a MIMO reverse path signal of the FDD service using one master unit frequency shifter and frequency shifting a MIMO forward path signal of the FDD service using the other master unit frequency shifter, the frequency shifting resulting in a forward path frequency shifted signal and a reverse path signal shifted back to an original frequency, the two signals being transferred bi-directionally through the single coaxial cable.

26. The method of claim 25, wherein the remote unit includes two remote unit frequency shifters, and wherein the step of transferring further includes, at the remote unit, frequency shifting a MIMO forward path signal of the FDD service using one remote unit frequency shifter and frequency shifting a MIMO reverse path signal of the FDD service using the other remote unit frequency shifter, the frequency shifting resulting in a reverse path frequency shifted signal and a forward path signal shifted back to an original frequency, the two signals being transferred bi-directionally through the single co-axial cable.

27. The method of claim 26, wherein the master unit includes an additional master unit frequency shifter and wherein the frequency shifting at the master unit further includes frequency shifting the reverse path and forward path signals using time domain division (TDD).

28. The method of claim 27, wherein the remote unit includes an additional remote unit frequency shifter and wherein the frequency shifting at the remote unit further includes frequency shifting the reverse path and forward path signals using time domain division (TDD).

29. The method of claim 23, wherein the step of transferring includes, at the master unit, transferring another MIMO reverse path signal of the one service from the single coaxial cable to the one service without frequency shifting the other MIMO reverse path signal of the one service and transferring another MIMO forward path signal of the one service from the one service to the single coaxial cable without frequency shifting the other MIMO forward path signal of the one service.

30. The method of claim 24, wherein the step of transferring includes, at the remote unit, transferring another MIMO forward path signal of the one service to its respective one of the two antennas from the single coaxial cable without frequency shifting the other MIMO forward path signal of the one service and transferring another MIMO reverse path signal of the one service from its respective one of the two antennas to the single coaxial cable without frequency shifting the other MIMO reverse path signal of the one service.

31. The method of claim 25, wherein the step of transferring further includes, at the master unit, transferring another MIMO reverse path signal of the FDD service from the single coaxial cable to the FDD service without frequency shifting the other MIMO reverse path signal of the FDD service and transferring another MIMO forward path signal of the FDD service from the FDD service to the single coaxial cable without frequency shifting the other MIMO forward path signal of the FDD service.

32. The method of claim 26, wherein the step of transferring includes, at the remote unit, transferring another MIMO forward path signal of the FDD service to its respective one of the two antennas from the single coaxial cable without frequency shifting the other MIMO forward path signal of the FDD service and transferring another MIMO reverse path signal of the FDD service from its respective one of the two antennas to the single coaxial cable without frequency shifting the other MIMO reverse path signal of the FDD service.

33. The method of claim 22, wherein each of the at least one service that uses MIMO signals is a MIMO time domain division (TDD) service, wherein the step of transferring includes, at the master unit, shifting respective MIMO reverse path signals of each service and respective MIMO forward path signals of each service using time domain division, the frequency shifting resulting in two respective forward path frequency shifted signals at two different respective forward path frequencies and two respective reverse path signals shifted back to respective original frequencies, the four signals being transferred bi-directionally through the single coaxial cable.

34. The method of claim 33, wherein the step of transferring further includes, at the remote unit, frequency shifting respective MIMO forward path signals of each service and respective MIMO reverse path signals of each service using time domain division, the frequency shifting resulting in two respective reverse path frequency shifted signals at two different respective reverse path frequencies and two respective forward path signals shifted back to respective original frequencies, the four signals being transferred bi-directionally through the single coaxial cable.

35. The method of claim 22, wherein each of the at least one service that uses MIMO signals is a MIMO frequency domain division (FDD) service, wherein the master unit includes four master unit frequency shifters, and wherein the step of transferring includes, at the master unit, frequency shifting two respective MIMO reverse path signals of each FDD service using two respective master unit frequency shifters and frequency shifting two respective MIMO forward path signals of each FDD service using two other respective master unit frequency shifters, the frequency shifting resulting in two respective forward path frequency shifted signals at two different respective forward path frequencies and two respective reverse path signals shifted back to respective original frequencies, the four signals being transferred bi-directionally through the single coaxial cable.

36. The method of claim 35, wherein the remote unit includes four remote unit frequency shifters, and wherein the step of transferring further includes, at the remote unit, frequency shifting two respective MIMO forward path signals of each FDD service using two respective remote unit frequency shifters and frequency shifting two respective MIMO reverse path signals of each FDD service using two other respective remote unit frequency shifters, the frequency shifting resulting in two respective reverse path frequency shifted signals at two different respective reverse path frequencies and two respective forward path signals shifted back to respective original frequencies, the four signals being transferred bi-directionally through the single coaxial cable.

37. The method of claim 22, wherein the reverse path and forward path signals of the two services are transferred bi-directionally between the master and remote units through both the single coaxial cable and another transmission medium, other than a coaxial cable, that is operatively coupled in series with the single coaxial cable.

38. The method of claim 22, wherein the transmission medium is a fiber optic cable.

39. A remote unit, for a distributed antenna system, comprising:
   a) a coaxial cable port for receiving a plurality of signals of at least one MIMO service, in different respective frequency bands, from a single coaxial cable;
   b) a corresponding plurality of frequency shifters for, for each at least one MIMO service, shifting respective signals from said respective frequency bands to a frequency band of the each MIMO service;
   c) a service combiner for directing each signal to its respective frequency shifter; and
   d) for each frequency shifter, a respective antenna port for transmitting the respective shifted signal of the each frequency shifter to a respective MIMO antenna.

40. The remote unit of claim 39, wherein the coaxial cable port is also for receiving a reference signal, and wherein the remote unit further comprises:
   e) an oscillator that is synchronized with the reference signal.

41. The remote unit of claim 39, wherein the at least one MIMO service is a WiFi service.

42. The remote unit of claim 39, wherein the coaxial cable port is for receiving a respective plurality of the signals from each of a plurality of MIMO services, each antenna port having associated therewith one frequency shifter for each MIMO service; and wherein the remote unit further comprises:

e) for each antenna port, a respective multiplexer for combining the respective shifted signals of the frequency shifters that are associated therewith for transmission via the respective MIMO antenna of the each antenna port.

43. A remote unit, for a distributed antenna system, comprising:
   a) a plurality of antenna ports for receiving respective signals of at least one MIMO service;
   b) for each antenna port and for each MIMO service, a respective frequency shifter for shifting the respective signal of the each antenna port and the each MIMO service to a different respective shifted frequency band;
   c) a service combiner for combining all the shifted signals; and
   d) a coaxial cable port for transmitting the combined shifted signals via a single coaxial cable.

44. The remote unit of claim 43, wherein the coaxial cable port is also for receiving a reference signal, and wherein the remote unit further comprises:
   e) an oscillator that is synchronized with the reference signal.

45. The remote unit of claim 43, wherein the at least one MIMO service is a WiFi service.

46. The remote unit of claim 43, wherein the plurality of antenna ports is for receiving respective signals of each of a plurality of MIMO services; and wherein the remote unit further comprises:
   e) for each antenna port, a respective multiplexer for directing the respective signal, of each MIMO service, that is received at the each antenna port, to the respective frequency shifter of the each signal of the each MIMO service.

* * * * *